(12) United States Patent
Kim et al.

(10) Patent No.: US 8,315,346 B2
(45) Date of Patent: Nov. 20, 2012

(54) METHOD FOR TRANSMITTING/RECEIVING FEEDBACK INFORMATION IN A MULTI-ANTENNA SYSTEM SUPPORTING MULTIPLE USERS, AND FEEDBACK SYSTEM SUPPORTING THE SAME

(75) Inventors: Ho-Jin Kim, Seoul (KR); Sung-Jin Kim, Suwon-si (KR); Jianjun Li, Yongin-si (KR); Yong-Xing Zhou, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1519 days.

(21) Appl. No.: 11/725,019

(22) Filed: Mar. 16, 2007

(65) Prior Publication Data

US 2011/0122971 A1 May 26, 2011

Related U.S. Application Data

(60) Provisional application No. 60/782,626, filed on Mar. 16, 2006.

(30) Foreign Application Priority Data

Oct. 24, 2006 (KR) .................. 10-2006-0103696

(51) Int. Cl.
*H04L 7/00* (2006.01)
(52) U.S. Cl. ...................... 375/358; 375/354
(58) Field of Classification Search .............. 375/316, 375/358, 354
See application file for complete search history.

(56) References Cited

U.S. PATENT DOCUMENTS

| | | | |
|---|---|---|---|
| 7,471,963 B2 | 12/2008 | Kim et al. | |
| 2003/0198184 A1* | 10/2003 | Huang et al. | 370/231 |
| 2005/0043031 A1 | 2/2005 | Cho et al. | |
| 2005/0101259 A1 | 5/2005 | Tong et al. | |
| 2005/0129137 A1 | 6/2005 | Yamada et al. | |
| 2005/0192019 A1 | 9/2005 | Kim et al. | |
| 2005/0201307 A1 | 9/2005 | Chae et al. | |
| 2005/0254457 A1 | 11/2005 | Jung et al. | |
| 2006/0165191 A1 | 7/2006 | Lin et al. | |
| 2006/0203891 A1* | 9/2006 | Sampath et al. | 375/132 |
| 2007/0223367 A1 | 9/2007 | Wu et al. | |

FOREIGN PATENT DOCUMENTS

| | | |
|---|---|---|
| CN | 1691539 A | 11/2005 |
| EP | 1 227 539 A1 | 7/2002 |
| JP | 2003-318815 | 11/2003 |
| KR | 10-2005-0031841 | 4/2005 |
| KR | 10-2006-0019480 | 3/2006 |

(Continued)

OTHER PUBLICATIONS

Chinese Office Action issued Aug. 3, 2011, in counterpart Chinese Patent Application No. 200780007791.9 (6 pages).

(Continued)

*Primary Examiner* — David C. Payne
*Assistant Examiner* — Brian J Stevens
(74) *Attorney, Agent, or Firm* — NSIP Law

(57) ABSTRACT

A method for transmitting/receiving feedback information in a multi-antenna system using a closed-loop scheme supporting multiple users, and a feedback system supporting the same. Multiple feedback protocol scenarios are predefined on the basis of communication environments affecting feedback information configurations. The feedback information is transmitted in a feedback protocol scenario determined by a communication environment. The feedback information is constructed with information required by the communication environment.

28 Claims, 8 Drawing Sheets

FOREIGN PATENT DOCUMENTS

| | | |
|---|---|---|
| WO | WO 02/082689 A2 | 10/2002 |
| WO | WO-03/058871 A1 | 7/2003 |
| WO | WO 2004/038985 A2 | 5/2004 |
| WO | WO 2004/086712 A2 | 10/2004 |
| WO | WO 2005/081444 A1 | 9/2005 |
| WO | WO 2005/107125 A1 | 11/2005 |
| WO | WO 2005125020 A1 * | 12/2005 |
| WO | WO 2006018710 A1 * | 2/2006 |

OTHER PUBLICATIONS

Japanese Office Action issued Jun. 21, 2011, in counterpart Japanese Patent Application No. 2009-500301 (4 pages).

Japanese Examination Report dated Jul. 3, 2012, issued in counterpart Japanese Patent Application No. 2009-500301; 3 pages.

* cited by examiner

METHOD FOR TRANSMITTING/RECEIVING FEEDBACK INFORMATION IN A MULTI-ANTENNA SYSTEM SUPPORTING MULTIPLE USERS, AND FEEDBACK SYSTEM SUPPORTING THE SAME

PRIORITY

This application claims the benefit under 35 U.S.C. §119 (a) of an application filed in the United States Patent and Trademark Office on Mar. 16, 2006 and assigned Ser. No. 60/782,626 and an application filed in the Korean Intellectual Property Office on Oct. 24, 2006 and assigned Serial No. 2006-103696, the entire disclosure of which is hereby incorporated by reference.

BACKGROUND OF THE INVENTION

1. Field of the Invention

The present invention generally relates to a multi-antenna system using a closed-loop scheme, and more particularly to a method for transmitting/receiving feedback information in a multi-antenna system supporting multiple users, and a feedback system supporting the same.

2. Description of the Related Art

In wireless channel environments, as opposed to wired channel environments, reliability may be low due to multi-path interference, shadowing, propagation attenuation, time variant noise, interference, and the like. There is a problem in that a data transmission rate may not increase due to the low reliability in mobile communication environments.

To overcome these problems, a multiple-input multiple-output (MIMO) system has been proposed. The MIMO system is a representative example of a multi-antenna system.

The multi-antenna system supports a single-user mode and a multi-user mode. In the single-user mode, data is transmitted to the same user via multiple transmit antennas. In the multi-user mode, data is transmitted to multiple users via multiple transmit antennas.

The multi-antenna system is divided into a closed-loop scheme in which resource allocation depends on feedback information, and an open-loop scheme independent of the feedback information. To transmit the feedback information in the multi-antenna system using the closed-loop scheme, a full feedback scheme and a single feedback scheme are present.

When precoding is used, the full feedback scheme is a scheme in which each user feeds back information regarding all transmission rates mapped to all column vectors within a codebook. The full feedback scheme has superior performance in terms of resource allocation, but is disadvantageous since there is a large amount of feedback information. When the feedback information to be generated increases, not only system complexity may increase, but also an amount of resources required to transmit the feedback information may increase.

When precoding is used, the single feedback scheme is that in which each user feeds back only index information of a column vector having a highest transmission rate. The single feedback scheme may reduce an amount of feedback information. However, it is difficult to expect optimal resource allocation in the single feedback scheme.

In the multi-antenna system using the closed-loop scheme as described above, an important problem is to provide a scheme for efficiently allocating resources on the basis of minimum feedback information. In particular, it is urgent to provide a scheme for transmitting optimal feedback information while taking into consideration an operating mode, a feedback scheme, and the like, in the multi-antenna system.

SUMMARY OF THE INVENTION

An aspect of the present invention is to address at least the above problems and/or disadvantages and to provide at least the advantages described below. Accordingly, an aspect of the present invention is to provide a method for receiving feedback information when the feedback information mapped to an operating mode is transmitted in a multi-antenna system using a closed-loop scheme, and a feedback system supporting the same.

A further aspect of the present invention is to provide a method for receiving feedback information when the feedback information mapped to a feedback scheme is transmitted in a multi-antenna system using a closed-loop scheme, and a feedback system supporting the same.

A still further aspect of the present invention is to provide a method for generating transmission parameters based on feedback information while taking into consideration an operating mode, a feedback scheme, and the like, and transmitting data based on the transmission parameters in a multi-antenna system using a closed-loop scheme, and a feedback system supporting the same.

In accordance with an aspect of the exemplary embodiments of the present invention, there is provided a method for transmitting feedback information in a receiver of a multi-antenna system using a closed-loop scheme supporting multiple users, including selecting a feedback protocol scenario based on a communication environment from a plurality of feedback protocol scenarios; generating feedback information mapped to the selected feedback protocol; and providing a transmitter with the generated feedback information using the selected feedback protocol scenario.

In accordance with another aspect of the exemplary embodiments of the present invention, there is provided a method for receiving feedback information in a transmitter of a multi-antenna system using a closed-loop scheme supporting multiple users, including selecting a feedback protocol scenario based on a communication environment from a plurality of feedback protocol scenarios; and receiving feedback information from a receiver using the selected feedback protocol.

In accordance with a further aspect of the exemplary embodiments of the present invention, there is provided a feedback system for use in a multi-antenna system using a closed-loop scheme supporting multiple users, including a receiver for selecting a feedback protocol scenario based on a communication environment from a plurality of feedback protocol scenarios, generating feedback information mapped to the selected feedback protocol, and transmitting the generated feedback information using the selected feedback protocol scenario; and a transmitter for selecting a feedback protocol scenario based on a communication environment using the feedback information received from the receiver and allocating transmission parameters mapped to the selected feedback protocol scenario.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF EXEMPLARY EMBODIMENTS

Exemplary embodiments of the present invention will be described in detail herein below with reference to the accompanying drawings. The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A scheme for generating feedback information through various feedback scenarios in a multi-antenna system using a closed-loop scheme in accordance with exemplary embodiments of the present invention will be described. Moreover, a scheme for generating transmission parameters based on received scenario-by-scenario feedback information in accordance with exemplary embodiments of the present invention will be described.

First, parameters used in the exemplary embodiments of the present invention are defined as follows.

$M_t$: Number of transmit antennas
L: Number of codebooks in one code set
N: Number of precoding matrices in one codebook
M: Number of precoding vectors in a given precoding matrix
Q: Number of bits for channel quality information (CQI)

Hereinafter, exemplary embodiments of the present invention will be described with reference to the above-defined parameters and the accompanying drawings.

Figure 1:
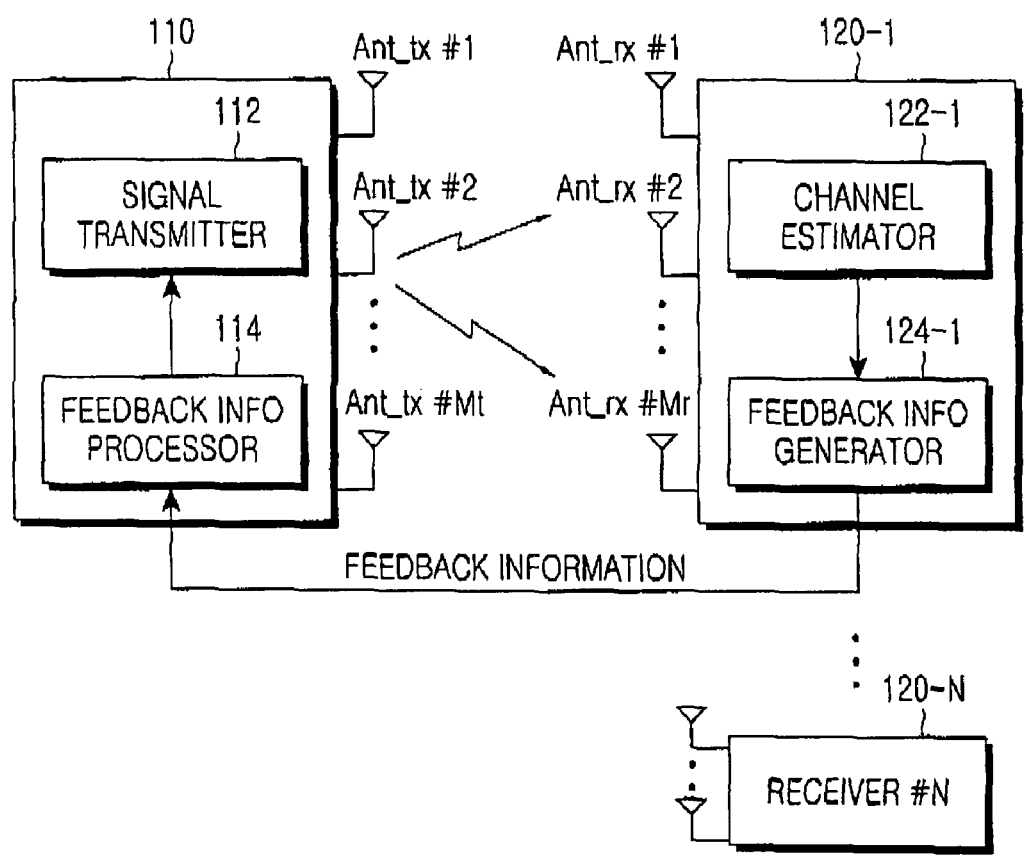
FIG. 1 is a block diagram illustrating a multi-antenna system using a closed-loop scheme supporting multiple users in accordance with an exemplary embodiment of the present invention.

FIG. 1 is a block diagram illustrating a multi-antenna system using a closed-loop scheme supporting multiple users in accordance with an exemplary embodiment of the present invention.

Specifically, FIG. 1 illustrates an example of the multi-antenna system constructed with one transmitter 110 and multiple receivers 120-1 to 120-N. It can be assumed that the transmitter 110 is a Node B and the multiple receivers 120-1 to 120-N are user equipments (UEs). An operation based on one receiver 120-1 will be described below. Of course, the operation can be equally applied to the other receivers.

Referring to FIG. 1, a channel estimator 122-1 of the receiver 120-1 estimates a channel using a signal received via at least one receive antenna. When the channel is estimated, the channel estimator 122-1 acquires CQI from the estimated channel. The acquired CQI is mapped to data streams of column vectors of each precoding matrix. The CQI can be expressed by CQI values. That is, the channel estimator 122-1 measures CQI values based on precoding matrices or precoding vectors through the channel estimation.

A feedback information generator 124-1 of the receiver 120-1 generates feedback information based on the measured CQI values in at least one feedback protocol scenario. The generated feedback information can be constructed with optimal information in a target feedback protocol scenario. The feedback protocol scenarios to be considered in the feedback information generator 124-1 will be described in detail below. To generate the feedback information, a codebook is predefined between the transmitter and the receiver in the multi-antenna system.

As proposed in exemplary embodiments of the present invention, all the receivers 120-1 to 120-N generate feedback information and send the generated feedback information to the transmitter 110.

A feedback information processor 114 of the transmitter 110 receives feedback information from all the receivers 120-1 to 120-N. The feedback information processor 114 selects at least one user (or receiver) and at least one unitary matrix for precoding using the received feedback information. The unitary matrix for precoding is selected by the feedback information from each receiver.

The feedback information processor 114 provides a signal transmitter 112 with information regarding at least one selected receiver and at least one selected unitary matrix. The signal transmitter 112 transmits to at least one selected receiver data streams via multiple transmit antennas after precoding the data streams to be transmitted on the basis of at least one selected unitary matrix.

Figure 2:
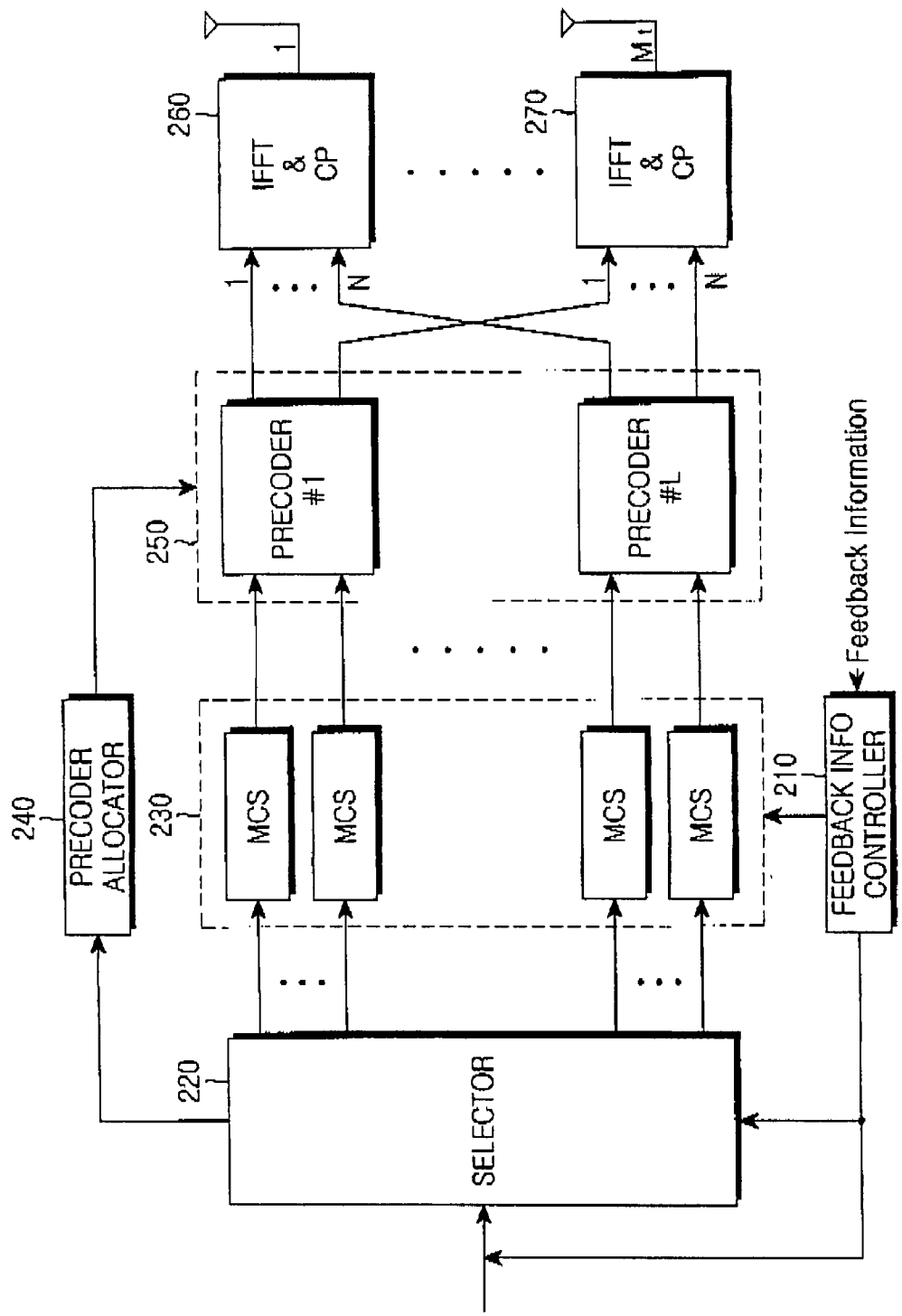
FIG. 2 is a block diagram illustrating a structure of a transmitter in accordance with an exemplary embodiment of the present invention.

FIG. 2 is a block diagram illustrating a structure of the transmitter in accordance with an exemplary embodiment of the present invention.

Referring to FIG. 2, a feedback information controller 210 receives feedback information from multiple receivers and controls an overall operation for transmitting data streams using the received feedback information. The feedback information processor 114 of FIG. 1 can be constructed with the feedback information controller 210 and a precoder allocator 240.

Under control of the feedback information controller 210, a selector 220 selects a single user in spatial division multiplexing (SDM) in a single-user-multiple input multiple output (SU-MIMO) mode and selects at least two users in spatial division multiple access (SDMA) in a multi-user-MIMO (MU-MIMO) mode. That is, the selector 220 selects whether to transmit streams to single or multiple receivers.

Under the control of the feedback information controller 210, the selector 220 allocates data streams to be transmitted and subchannels on which the data streams are transmitted. Moreover, the selector 220 determines a modulation and coding scheme (MCS) level for a data transmission, a precoder and a rank. The selector 220 outputs the data streams to be transmitted to the selected receiver(s) and provides the precoder allocator 240 with information regarding the precoder and the rank. The precoder allocator 240 generates control information required for precoding the data streams to be transmitted and outputs the control information to precoders 250.

MCS units 230 encode the data streams at optimal coding rates and modulate the encoded data (bit) streams in optimal modulation schemes. For this, the feedback information controller 210 controls the MCS units 230. The MCS units 230 are constructed with multiple MCSs on a data stream-by-data stream basis.

The precoders 250 use predefined codebooks for precoding. To design the codebooks to be used for the precoders 250, various schemes have been proposed. Typically, a fast Fourier transform (FFT) precoder, a Givens precoder and a Grassmannian precoder are provided. Since the codebook design schemes are well known, a description is omitted.

The precoders 250 precode the data streams output from the MCS units 250 using the designed codebooks. Precoding matrices based on the codebooks are selected by the control information provided from the precoder allocator 240. Inverse fast Fourier transform (IFFT) and cyclic prefix (CP) units 260 and 270 transform modulated symbol streams output through precoding according to IFFT processes and insert CPs into the transformed streams. The streams are transmitted via at least one transmit antenna.

Figure 3:
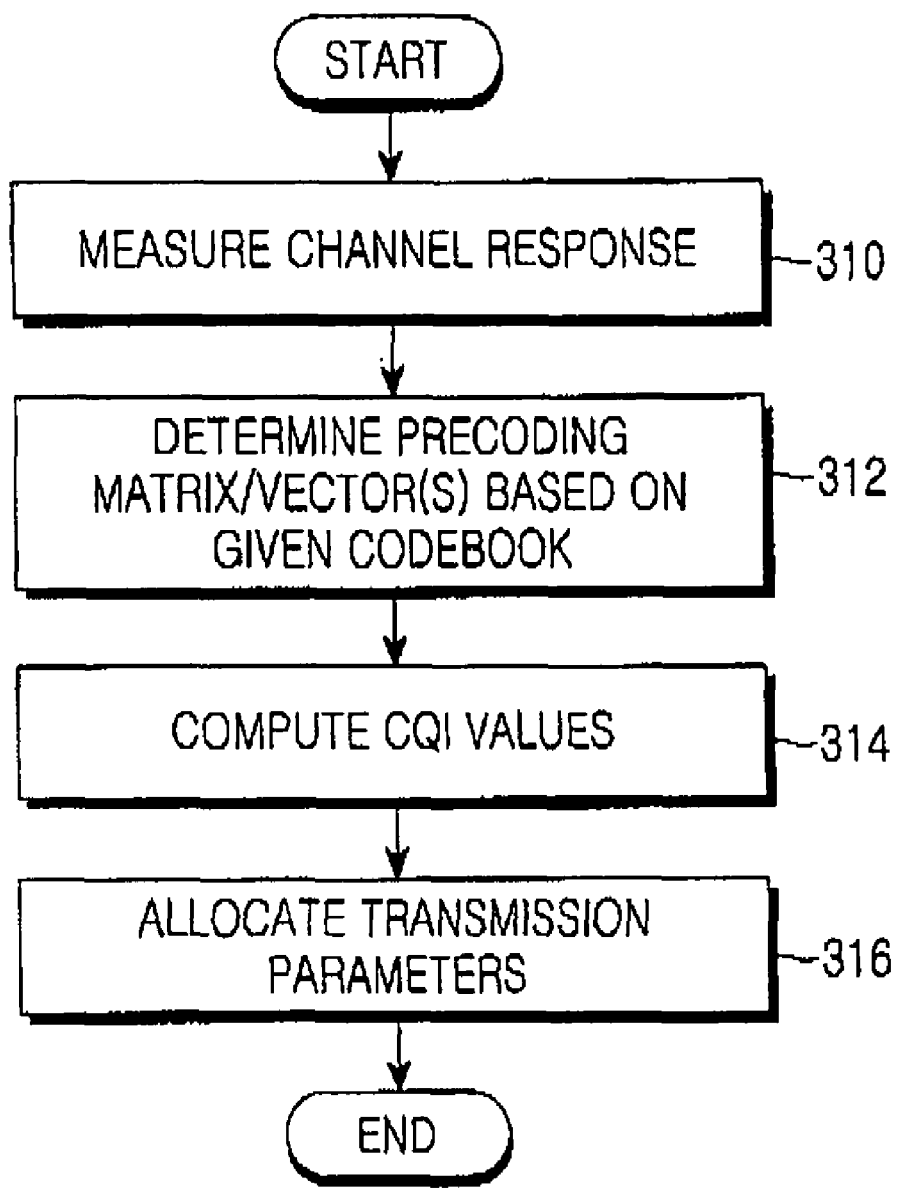
FIG. 3 is a process flowchart illustrating first to third feedback scenarios in accordance with an exemplary embodiment of the present invention.

FIG. 3 is a process flowchart illustrating first to third feedback scenarios in accordance with an exemplary embodiment of the present invention.

In the first feedback scenario, receivers provide a transmitter with precoding matrices. The precoding matrices provided to the transmitter include all measured CQI values based on beamforming vectors constructing each precoding matrix. In this case, the size of the feedback information is defined by (Q×M×N). CQI values for all the precoding matrices are fed back. Thus, the first feedback scenario has the highest overhead among all possible scenarios.

In the second feedback scenario, a receiver selects one of precoding matrices constructing a codebook and provides CQI values based on the selected precoding matrix as the feedback information. In this case, the size of the feedback information is defined by ($\lceil \log_2(N) \rceil$+QM), where $\lceil n \rceil$ indicates the smallest integer greater than or equal to n. The feedback information includes a precoding matrix index defined by $\lceil \log_2(N) \rceil$ and CQI values based on the selected precoding matrix defined by QM. Thus, the second feedback scenario has less overhead than the first feedback scenario.

In the third feedback scenario, a receiver provides a single beamforming vector of a precoding matrix selected from a given codebook and a CQI value based on the single beamforming vector as the feedback information. In this case, the size of the feedback information is defined by ($\lceil \log_2(N) \rceil$+$\lceil \log_2(M) \rceil$+Q). The feedback information includes a precoding matrix index defined by $\lceil \log_2(N) \rceil$, a precoding vector index of the selected precoding matrix defined by $\lceil \log_2(M) \rceil$, and a CQI value based on the selected precoding vector defined by Q. The third feedback scenario has less overhead than the second feedback scenario.

As illustrated in FIG. 3, the receiver measures a channel response through channel estimation (step 310). The receiver selects a precoding matrix and/or a beamforming vector(s) on the basis of a given codebook (step 312).

The receiver computes CQI values based on the precoding matrix and/or the beamforming vector(s) selected in step 312 (step 314). The receiver generates feedback information including the computed CQI values and indices of the selected precoding matrix and/or the selected beamforming vector(s). The generated feedback information is sent to the transmitter.

Upon receiving the feedback information, the transmitter allocates transmission parameters using the received feedback information (step 316). The transmission parameters include those related to a user, stream, subchannel, precoder, rank, and MCS.

Figure 4:
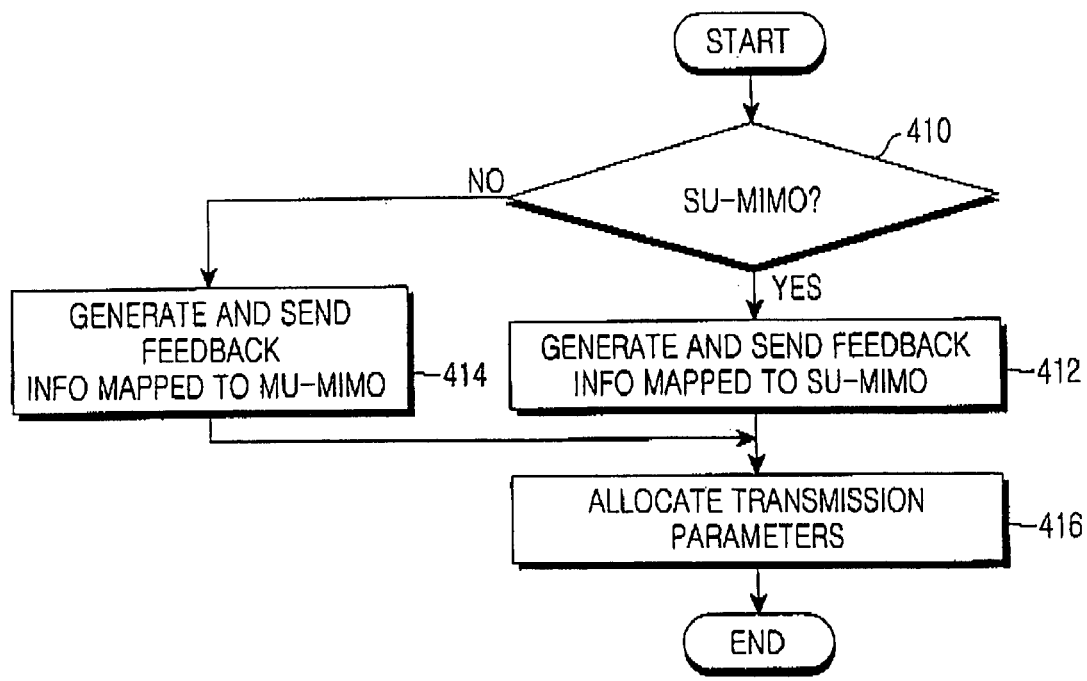
FIG. 4 is a process flowchart illustrating a fourth feedback scenario in accordance with an exemplary embodiment of the present invention.

FIG. 4 is a process flowchart illustrating a fourth feedback scenario in accordance with an exemplary embodiment of the present invention.

In the fourth feedback scenario, a receiver selects at least one operating mode between MU-MIMO mode supporting multiple users and SU-MIMO mode supporting a single user, on the basis of the number of users. The operating mode is selected on the basis of a temporarily stored active user set in a cell. The selected operating mode can be indicated by L2 signaling. The receiver can generate different feedback information between the operating modes.

When the operating mode is set to the SU-MIMO mode, the size of the feedback information is defined by $$\left( \lceil \log_2(N) \rceil + \lceil \log_2(M) \rceil + \left\lceil \log_2 \binom{M_t}{M} \right\rceil + QM \right).$$

The feedback information includes a precoding matrix index defined by $\lceil \log_2(N) \rceil$, a rank selection value defined by $\lceil \log_2(M) \rceil$, a precoding vector index of a selected precoding matrix defined by $$\left\lceil \log_2 \binom{M_t}{M} \right\rceil,$$

and a CQI value(s) based on a selected precoding vector(s) defined by $$QM \cdot \log_2 \binom{M_t}{M}$$

is a combination function $$\frac{M_t!}{M!(M_t - M)!}.$$

As described above, the rank is selected on the basis of beamforming vectors. The number of CQI values depends on the rank.

In addition, when the operating mode is set to the MU-MIMO mode, the above-described first to third feedback scenarios can be applied. Assuming that the second feedback scenario is applied, the size of the feedback information is defined by ($\lceil \log_2(N) \rceil$+QM). The feedback information includes a precoding matrix index defined by $\lceil \log_2(N) \rceil$ and CQI values based on a selected precoding matrix defined by QM.

As illustrated in FIG. 4, the receiver determines whether the operating mode to be supported is the SU-MIMO or MU-MIMO mode (step 410). The operating mode can be identified by L2 signaling.

If the SU-MEMO mode is supported, the receiver generates feedback information (step 412). The generated feedback information is constructed with precoding matrix index, a beamforming vector index, a rank selection value, and CQI values. Otherwise, if the MU-MIMO mode is supported, the receiver generates feedback information based on a precoding matrix index and CQI values (step 414). The receiver transmits to the transmitter the feedback information generated in step 412 or 414.

The transmitter allocates transmission parameters using the feedback information received from the receiver (step 416). The transmission parameters include at least one parameter related to a user, stream, subchannel, precoder, rank and MCS.

Figure 5:
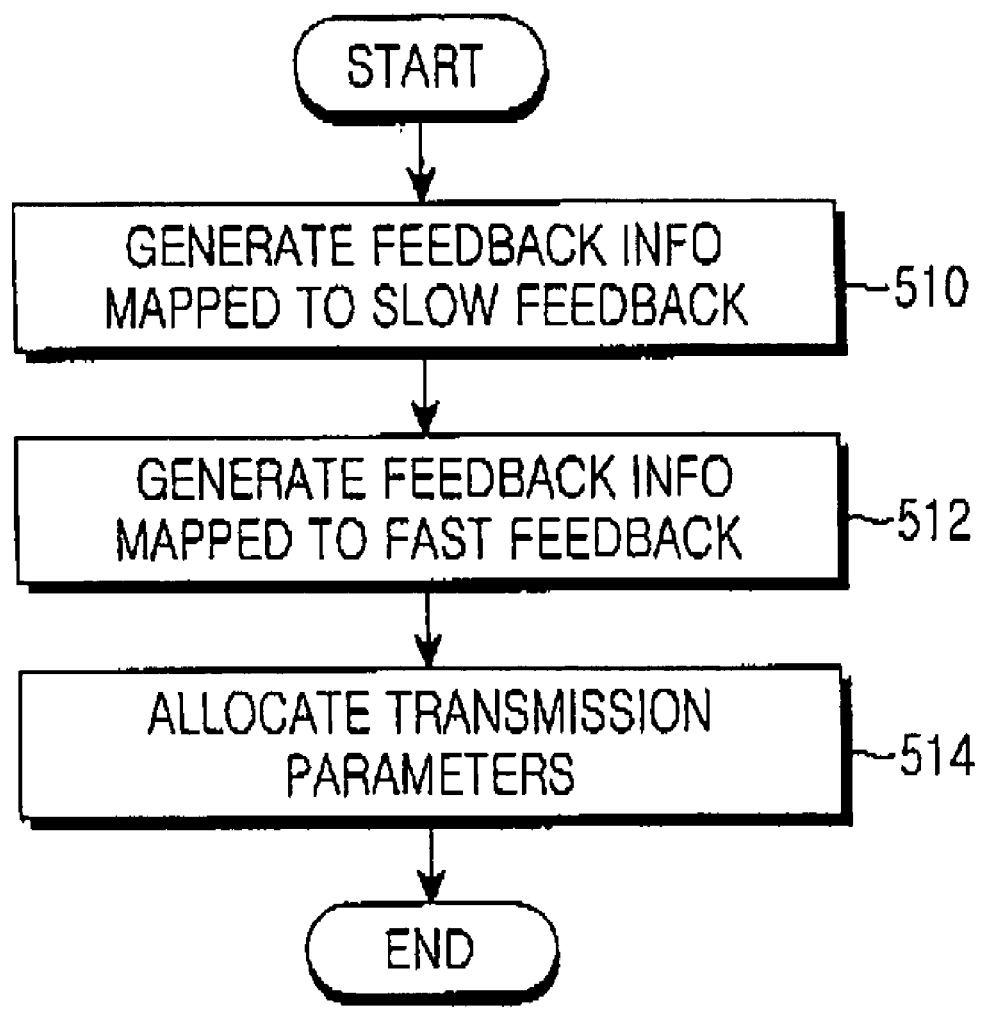
FIG. 5 is a process flowchart illustrating a fifth feedback scenario in accordance with an exemplary embodiment of the present invention.

FIG. 5 is a process flowchart illustrating a fifth feedback scenario in accordance with an exemplary embodiment of the present invention.

The fifth feedback scenario is used in only the SU-MIMO mode. A receiver selects one of slow feedback signaling and fast feedback signaling. The receiver generates feedback information using a rank selection index and a codebook index in the slow feedback signaling and generates feedback information using only a precoding matrix in the fast feedback signalling.

In the slow feedback signaling, the generated feedback information has the size of ($\lceil \log_2(M_L) \rceil + \lceil \log_2(L) \rceil$). The feedback information includes a rank selection index defined by $\lceil \log_2(M_L) \rceil$ and a codebook index defined by $\lceil \log_2(L) \rceil$.

In the fast feedback signaling, the generated feedback information has the size of ($\lceil \log_2(N) \rceil + QM_L$). The feedback information includes a precoding matrix index defined by $\lceil \log_2(N) \rceil$ and a CQI value(s) based on a selected precoding matrix defined by $QM_L$, that is, (Q×1) to (Q×M).

As illustrated in FIG. 5, the receiver selects one of a slow feedback and a fast feedback on the basis of a feedback information rate. If the slow feedback mode is selected, the receiver generates feedback information with a rank selection index and a codebook index and sends the generated feedback information to the transmitter (step 510). Otherwise, if the fast feedback mode is selected, the receiver generates feedback information with a precoding matrix index and a CQI value(s). The generated feedback information is sent to the transmitter (step 512).

When receiving the feedback information generated in step 510 or 512, the transmitter allocates transmission parameters using the received feedback information (step 514). The allocated transmission parameters include at least one parameter related to a user, stream, subchannel, precoder, rank and MCS.

Figure 6:
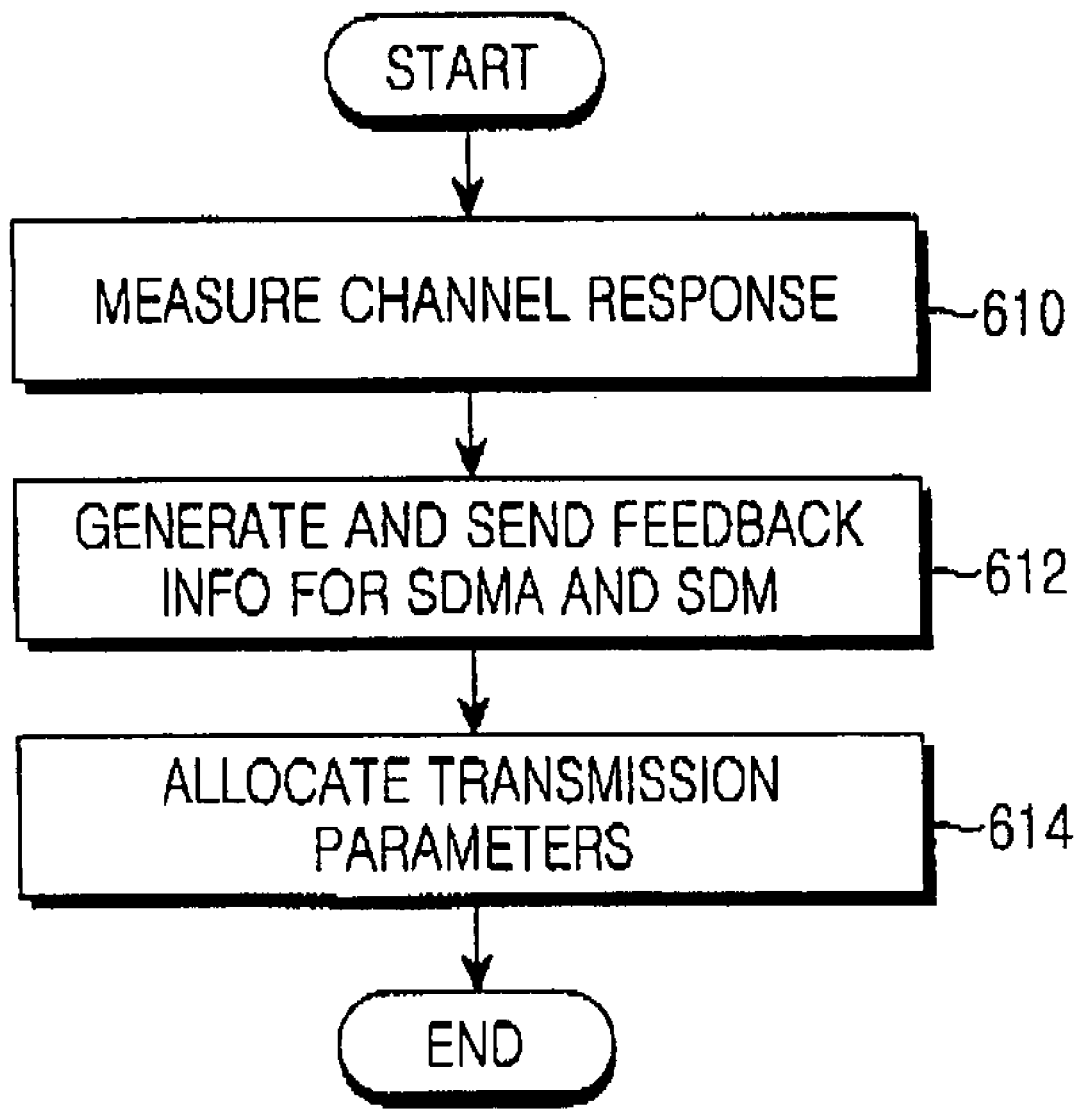
FIG. 6 is a process flowchart illustrating a sixth feedback scenario in accordance with an exemplary embodiment of the present invention.

FIG. 6 is a process flowchart illustrating a sixth feedback scenario in accordance with an exemplary embodiment of the present invention.

The sixth feedback scenario can be applied when the SU-MIMO and MU-MIMO modes are dynamically selected. A receiver generates the feedback information using the best beamforming vector for the SU-MIMO mode and generates the feedback information using a rank and beamforming vectors for the MU-MIMO mode.

The size of the generated feedback information is defined by ($\lceil \log_2(N) \rceil + \lceil \log_2(M) \rceil + Q + \lceil \log_2(M) \rceil + Q$) to ($\lceil \log_2(N) \rceil + \lceil \log_2(M) \rceil + Q + \lceil \log_2(M) \rceil + QM$). The feedback information includes a precoding matrix index defined by $\lceil \log_2(N) \rceil$, a precoding vector index of a selected precoding matrix defined by $\lceil \log_2(M) \rceil$, a CQI value based on a selected precoding vector defined by Q, a rank selection index defined by $\lceil \log_2(M) \rceil$, and a CQI value(s) based on a selected rank defined by QM, that is, (Q×1) to (Q×M).

Referring to FIG. 6, the receiver measures a channel response through channel estimation (step 610). Using the measured channel response, the receiver generates feedback information based on a precoding matrix, a beamforming vector and CQI in an SDMA scheme (for selecting at least two users in MU-MIMO mode) and generates feedback information based on a rank and CQI in an SDM scheme (for selecting a single user in SU-MIMO mode) (step 612). The receiver sends the generated feedback information to a transmitter.

Upon receiving the feedback information generated in step 612, the transmitter allocates transmission parameters using the received feedback information (step 614). The allocated transmission parameters include at least one parameter related to a user, stream, subchannel, precoder, rank and MCS.

Figure 7:
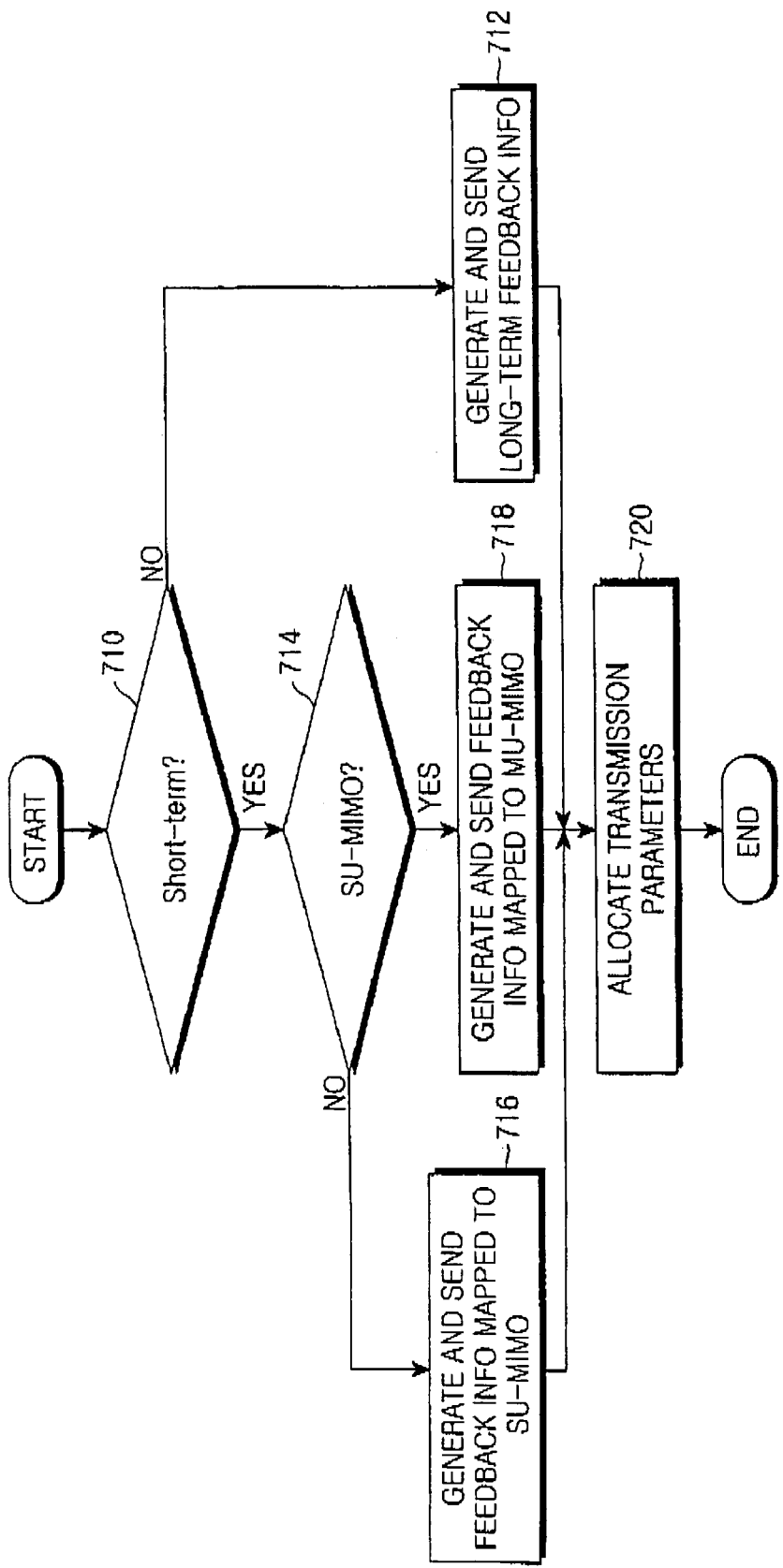
FIG. 7 is a process flowchart illustrating a seventh feedback scenario in accordance with an exemplary embodiment of the present invention.

FIG. 7 is a process flowchart illustrating a seventh feedback scenario in accordance with an exemplary embodiment of the present invention.

The seventh feedback scenario is determined by a period of feedback information. That is, a receiver supports two control-signaling schemes of a long-term feedback and a short-term feedback.

In the long-term feedback, the receiver can selectively support the SU-MIMO mode and the MU-MIMO mode. The SU-MIMO or MU-MIMO mode can be selected on the basis of a scheduled user set. In addition, the codebook selection and rank size are chosen in a period equal to a mode-switching period.

In the short-term feedback, the receiver generates feedback information using allocated CQI values and rank-based precoding vectors in the SU-MIMO made and generates feedback information using the precoding matrix and the CQI values in the MU-MIMO mode.

If the long-term feedback is performed, the size of the feedback information is defined by ($1 + \lceil \log_2(M) \rceil + \lceil \log_2(L) \rceil$). The feedback information includes a 1-bit identifier for SU/MU-MIMO mode selection, a rank selection value defined by $\lceil \log_2(M) \rceil$, and a codebook selection value defined by $\lceil \log_2(L) \rceil$.

When the receiver supports the SU-MIMO mode in the short-term feedback, the size of the feedback information is defined by $$\left(\lceil \log_2(N) \rceil + \left\lceil \log_2\binom{M_t}{M_L} \right\rceil + QM_L\right).$$

The feedback information includes a precoding matrix index defined by $\lceil \log_2(N) \rceil$, at least one precoding vector index of a selected precoding matrix defined by $$\left\lceil \log_2\binom{M_t}{M_L} \right\rceil,$$

and a CQI value(s) based on a selected precoding vector(s) defined by $QM_L$.

On the other hand, when the receiver supports the MU-MIMO mode in the short-term feedback, the size of the feedback information is defined by ($\lceil \log_2(N) \rceil + QM_L$). That is, the feedback information includes a precoding matrix index defined by $\lceil \log_2(N) \rceil$ and CQI values based on a selected precoding matrix defined by $QM_L$.

As illustrated in FIG. 7, the receiver determines a feedback information period (step 710). When deciding to send feedback information in the long term, the receiver generates the feedback information mapped to the long term (step 712). At this time, the generated feedback information includes an operating mode selection bit, a rank selection value and a codebook selection value.

However, when deciding to send feedback information in the short term in step 710, the receiver determines whether the operating mode to be supported is the SU-MIMO or the MU-MIMO mode (step 714). The operating mode can be indicated by L2 signaling.

When deciding to support the SU-MIMO mode in step 714, the receiver generates the feedback information (step 716). At this time, the generated feedback information is constructed with a precoding matrix index, a beamforming vector index and a CQI value(s). The receiver sends the feedback information to the transmitter. When deciding to support the MU-MIMO mode, the receiver generates feedback information with a precoding matrix index and CQI values. Then, the receiver sends the generated feedback information to the transmitter (step 718).

When receiving the feedback information generated in step 712, 716 or 718, the transmitter allocates transmission parameters using the received feedback information (step 720). The transmission parameters include at least one parameter related to a user, stream, subchannel, precoder, rank and MCS.

Figure 8:
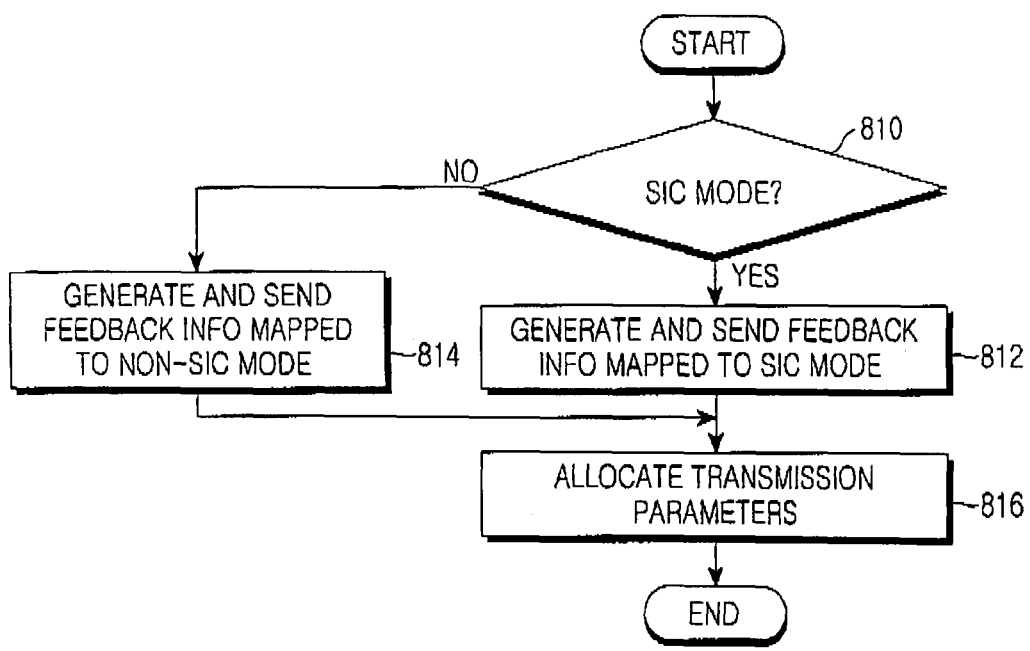
FIG. 8 is a process flowchart illustrating an eighth feedback scenario in accordance with an exemplary embodiment of the present invention.

FIG. 8 is a process flowchart illustrating an eighth feedback scenario in accordance with an exemplary embodiment of the present invention.

The eighth feedback scenario defines a feedback protocol taking into consideration the complexity of a receiver. This feedback protocol is divided into two modes. The two modes are a successive interference cancellation (SIC) mode and a non-SIC mode.

When the feedback protocol is in the SIC mode, the receiver generates feedback information including a precoding matrix index, a precoding vector index and CQI values. When the feedback protocol is in the non-SIC mode, the receiver generates feedback information by adding a rank selection index to the feedback information generated in the SIC mode.

When the receiver supports the SIC mode, the size of the feedback information is defined by ($\lceil \log_2(N) \rceil + \lceil \log_2(M) \rceil + Q + QM_L$). The feedback information includes a precoding matrix index defined by $\lceil \log_2(N) \rceil$, a precoding vector index of a selected precoding matrix defined by $\lceil \log_2(M) \rceil$, a CQI value based on a selected precoding vector defined by Q, and CQI values based on a selected rank defined by $QM_L$.

When the receiver supports the non-SIC mode, the size of the feedback information is defined by ($\lceil \log_2(N) \rceil + \lceil \log_2(M) \rceil + Q + \lceil \log_2(M) \rceil + QM_L$). The feedback information includes a precoding matrix index defined by $\lceil \log_2(N) \rceil$, a precoding vector index of a selected precoding matrix defined by $\lceil \log_2(M) \rceil$, a CQI value based on a selected precoding vector defined by Q, a rank selection index (from a stream 1 to a stream M) defined by $\lceil \log_2(M) \rceil$, and a CQI value(s) based on a selected rank defined by $QM_L$.

As illustrated in FIG. 8, the receiver determines whether a feedback is performed in the SIC or the non-SIC mode (step 810). When determining that the feedback is performed in the SIC mode, the receiver generates feedback information including a precoding matrix index, a beamforming vector index, a CQI value for SDMA, and a CQI value for SDM (step 812). The receiver sends the generated feedback information to the transmitter.

When determining that the feedback is performed in the non-SIC mode, the receiver generates feedback information including a precoding matrix index, a CQI value for SDMA, a rank selection index, and CQI values for SDM (step 814). The generated feedback information is sent to the transmitter.

When receiving the feedback information generated in step 812 or 814, the transmitter allocates transmission parameters using the received feedback information (step 816). The transmission parameters include at least one parameter related to a user, stream, subchannel, precoder, rank and MCS.

As described above, the present invention can provide a unique feedback protocol for generating optimal feedback information while taking into consideration an operating mode, a feedback scheme, and the like, in a multi-antenna system. Moreover, the present invention can efficiently allocate resources on the basis of minimum feedback information in the multi-antenna system, thereby improving system performance.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting feedback information in a receiver of a multi-antenna system using a closed-loop scheme supporting multiple users, comprising:
   selecting from a plurality of feedback protocol scenarios a feedback protocol scenario based on a communication environment;
   generating feedback information mapped to the selected feedback protocol scenario; and
   providing a transmitter with the generated feedback information using the selected feedback protocol scenario,
   wherein the feedback protocol scenario is selected based on the communication environment including at least one of the number of users, a feedback information rate and a feedback information period, and
   wherein when the feedback protocol scenario is determined by the feedback information period and is in a long-term feedback mode, a size of the generated feedback information is defined by an identifier for selecting a single-user mode, a rank selection value and a codebook selection value.

2. The method of claim 1, wherein generating the feedback information comprises generating the feedback information from channel quality information based on all beamforming vectors within a codebook for precoding when the feedback protocol scenario is not considered.

3. The method of claim 1, wherein generating the feedback information comprises:
   selecting from a codebook at least one precoding matrix achievable at a highest data rate for precoding when the feedback protocol scenario is not considered; and
   generating the feedback information from information related to the at least one precoding matrix and channel quality information based on beamforming vectors of the at least one precoding matrix.

4. The method of claim 3, wherein generating the feedback information comprises:
   selecting one beamforming vector from the at least one precoding matrix; and
   generating the feedback information from channel quality information based on the one beamforming vector.

5. The method of claim 1, wherein the feedback protocol scenario is divided into a multi-user mode and a single-user mode according to the number of users.

6. The method of claim 5, wherein when the feedback protocol scenario is in the multi-user mode, a size of the generated feedback information is defined by an index of a precoding matrix and channel quality information values based on the precoding matrix.

7. The method of claim 5, wherein when the feedback protocol scenario is in the single-user mode, a size of the generated feedback information is defined by an index of a precoding matrix, a rank selection value, an index of a precoding vector of the precoding matrix, and a channel quality information value based on the precoding vector.

8. The method of claim 1, wherein the feedback protocol scenario is divided into a slow feedback mode and a fast feedback mode according to a feedback information rate.

9. The method of claim 8, further comprising determining the communication environment by taking into consideration a multi-user mode and a single-user mode according to the number of users in the feedback protocol scenario of the fast feedback mode.

10. The method of claim 8, wherein a size of the generated feedback information is defined by a rank selection index and a codebook index.

11. The method of claim 8, wherein when the feedback protocol scenario is in the fast feedback mode, a size of the generated feedback information is defined by an index of a precoding matrix and at least one channel quality information value based on the precoding matrix.

12. The method of claim 1, wherein when the feedback protocol scenario is in a short-term feedback mode, a size of the generated feedback information is defined by an index of a precoding matrix and at least one precoding vector index of the precoding matrix.

13. The method of claim 1, wherein when the feedback protocol scenario has a short-term feedback in a multi-user mode, a size of the feedback information is defined by an index of a precoding matrix and channel quality information values based on the precoding matrix.

14. A method for receiving feedback information in a transmitter of a multi-antenna system using a closed-loop scheme supporting multiple users, comprising:
selecting a feedback protocol scenario based on a communication environment using feedback information received from a receiver; and
allocating transmission parameters mapped to the selected feedback protocol scenario,
wherein the feedback protocol scenario is selected based on the communication environment including at least one of the number of users, a feedback information rate and a feedback information period, and
wherein when the feedback protocol scenario is determined by the feedback information period and is in a long-term feedback mode, a size of the generated feedback information is defined by an identifier for selecting a single-user mode, a rank selection value and a codebook selection value.

15. The method of claim 14, wherein the transmission parameters include at least one parameter related to a user, stream, subchannel, rank, and modulation and coding scheme (MCS).

16. The method of claim 14, wherein the transmission parameters are allocated on a basis of at least one feedback protocol scenario determined by a communication environment of the receiver.

17. The method of claim 16, wherein the feedback protocol scenario is determined by at least one of an amount of the feedback information, a number of receivers, and a period in which the feedback information is transmitted.

18. The method of claim 14, wherein the received feedback information includes channel quality information based on all beamforming vectors within each codebook for precoding when the feedback protocol scenario is not considered.

19. The method of claim 14, wherein the received feedback information is generated from information related to a precoding matrix and channel quality information based on beamforming vectors of the precoding matrix after one precoding matrix achievable at a highest sum data rate is selected from a codebook for precoding when the feedback protocol scenario is not considered.

20. The method of claim 14, wherein the received feedback information is generated from channel quality information based on one beamforming vector after the one beamforming vector is selected from a precoding matrix.

21. A feedback system for use in a multi-antenna system using a closed-loop scheme supporting multiple users, comprising:
a receiver for selecting from a plurality of feedback protocol scenarios a feedback protocol scenario based on a communication environment, generating feedback information mapped to the selected feedback protocol, and transmitting the generated feedback information using the selected feedback protocol scenario; and
a transmitter for selecting a feedback protocol scenario based on a communication environment using the feedback information received from the receiver and allocating transmission parameters mapped to the selected feedback protocol scenario,
wherein the feedback protocol scenario is selected based on the communication environment including at least one of the number of users, a feedback information rate and a feedback information period,
wherein when the feedback protocol scenario is determined by the feedback information period and is in a long-term feedback mode, a size of the generated feedback information is defined by an identifier for selecting a single-user mode, a rank selection value and a codebook selection value.

22. The feedback system of claim 21, wherein the transmission parameters include at least one parameter related to a user, stream, subchannel, rank, and modulation and coding scheme (MCS).

23. The feedback system of claim 21, wherein the transmission parameters are allocated on a basis of at least one feedback protocol scenario determined by a communication environment of the receiver.

24. The feedback system of claim 23, wherein the feedback protocol scenario is determined by at least one of an amount of the feedback information, the number of receivers, and a period in which the feedback information is transmitted.

25. A receiver for use in a multi-antenna system using a closed-loop scheme supporting multiple users, comprising:
a channel estimator for estimating a channel from a received signal and acquiring channel quality information from the estimated channel; and
a feedback information generator for generating feedback information using the acquired channel quality information and one of a plurality of feedback protocol scenarios,
wherein the one of the plurality of feedback protocol scenarios is selected based on the communication environment including at least one of the number of users, a feedback information rate and a feedback information period, and
wherein when the feedback protocol scenario is determined by the feedback information period and is in a long-term feedback mode, a size of the generated feedback information is defined by an identifier for selecting a single-user mode, a rank selection value and a codebook selection value.

26. The receiver of claim 25, wherein the channel estimator measures channel quality information values based on at least one of a precoding matrix and a precoding vector using the estimated channel.

27. The receiver of claim 25, wherein the acquired channel quality information is based on data streams corresponding to column vectors of each precoding matrix.

28. The receiver of claim 25, wherein the feedback information generator sends the generated feedback information to a transmitter.

* * * * *